US010422912B2

(12) United States Patent
Holtz

(10) Patent No.: US 10,422,912 B2
(45) Date of Patent: Sep. 24, 2019

(54) DRILLING NOISE CATEGORIZATION AND ANALYSIS

(71) Applicant: HALLIBURTON ENERGY SERVICES, INC., Houston, TX (US)

(72) Inventor: Stephen Robert Holtz, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 336 days.

(21) Appl. No.: 15/503,309

(22) PCT Filed: Sep. 16, 2014

(86) PCT No.: PCT/US2014/055943
§ 371 (c)(1),
(2) Date: Feb. 10, 2017

(87) PCT Pub. No.: WO2016/043723
PCT Pub. Date: Mar. 24, 2016

(65) Prior Publication Data
US 2017/0235007 A1 Aug. 17, 2017

(51) Int. Cl.
G01V 1/50 (2006.01)
G01V 1/46 (2006.01)
(Continued)

(52) U.S. Cl.
CPC .............. *G01V 1/50* (2013.01); *E21B 4/003* (2013.01); *E21B 4/02* (2013.01); *E21B 7/04* (2013.01);
(Continued)

(58) Field of Classification Search
CPC ........ E21B 44/00; E21B 49/003; E21B 4/003; E21B 10/60; E21B 10/50; E21B 7/04;
(Continued)

(56) References Cited

U.S. PATENT DOCUMENTS 4,215,425 A 7/1980 Waggener
5,678,643 A * 10/1997 Robbins .................... E21B 7/04
166/255.2

(Continued)

FOREIGN PATENT DOCUMENTS

GB 2418732 3/2007
WO 2009/157837 12/2009

OTHER PUBLICATIONS

PCT International Search Report & Written Opinion, dated Jun. 18, 2015, Appl No. PCT/US2014/055943, "Drilling Noise Categorization and Analysis," Filed Sep. 16, 2014, 16 pgs.
(Continued)

*Primary Examiner* — Mischita L Henson
(74) *Attorney, Agent, or Firm* — Alan Bryson; Parker Justiss, P.C.

(57) ABSTRACT

A system includes at least one processing unit and a bottomhole assembly (BHA) that includes or communicates with the at least one processing unit. The BHA includes at least one drilling component and at least one acoustic transducer to convert drilling noise into one or more electrical signals. The at least one processing unit analyzes the one or more electrical signals or related data to categorize different components of the drilling noise as rock contact noise and mechanical noise. The at least one processing unit derives a data log, a plan, or a control signal based on the categorized drilling noise components.

22 Claims, 7 Drawing Sheets

(51) Int. Cl.

| | | |
|---|---|---|
| *E21B 44/00* | (2006.01) | |
| *E21B 4/00* | (2006.01) | |
| *E21B 4/02* | (2006.01) | |
| *E21B 7/04* | (2006.01) | |
| *E21B 10/50* | (2006.01) | |
| *E21B 10/60* | (2006.01) | |
| *E21B 49/00* | (2006.01) | |

(52) U.S. Cl.
CPC .............. *E21B 10/50* (2013.01); *E21B 10/60* (2013.01); *E21B 44/00* (2013.01); *E21B 49/003* (2013.01); *G01V 1/46* (2013.01); *G01V 2200/16* (2013.01); *G01V 2210/1216* (2013.01); *G01V 2210/1429* (2013.01); *G01V 2210/646* (2013.01)

(58) Field of Classification Search
CPC ... E21B 4/02; G01V 1/46; G01V 1/50; G01V 2210/646; G01V 2210/1429; G01V 2200/16; G01V 2210/1216
See application file for complete search history.

(56) References Cited

U.S. PATENT DOCUMENTS

| | | |
|---|---|---|
| 5,798,488 A | 8/1998 | Beresford et al. |
| 6,021,377 A | 2/2000 | Dubinsky et al. |
| 6,084,826 A | 7/2000 | Leggett, III |
| 6,230,557 B1 | 5/2001 | Ciglenec et al. |
| 6,272,434 B1 | 8/2001 | Wisler et al. |
| 6,382,332 B1 | 5/2002 | Eaton |
| 6,627,873 B2 | 9/2003 | Tchakarov et al. |
| 6,732,052 B2 | 5/2004 | MacDonald et al. |
| 6,843,120 B2 | 1/2005 | Standen |
| 6,941,231 B2 | 9/2005 | Zeroug et al. |
| 7,310,580 B2 | 12/2007 | Zhou et al. |
| 7,357,197 B2 | 4/2008 | Schultz et al. |
| 7,404,456 B2 | 7/2008 | Weaver et al. |
| 8,215,384 B2 | 7/2012 | Trinh et al. |
| 8,463,548 B2 | 6/2013 | Gies |
| 8,515,676 B2 | 8/2013 | Brink et al. |
| 2007/0127314 A1 | 6/2007 | Wang et al. |
| 2009/0107723 A1* | 4/2009 | Kusko ................. E21B 1/00 175/25 |
| 2010/0038135 A1 | 2/2010 | Hummes et al. |
| 2010/0095757 A1 | 4/2010 | Hansen |
| 2010/0319996 A1* | 12/2010 | Reese ................ E21B 10/567 175/57 |
| 2011/0066390 A1 | 3/2011 | MacLeod et al. |
| 2013/0075157 A1 | 3/2013 | Yang |
| 2013/0075159 A1 | 3/2013 | Yang |
| 2013/0085159 A1 | 4/2013 | Boechat et al. |
| 2013/0118807 A1 | 5/2013 | Yang |

OTHER PUBLICATIONS

PCT International Preliminary Report on Patentability, dated Sep. 16, 2016, Appl No. PCT/US2014/055943, "Drilling Noise Categorization and Analysis," Filed Sep. 16, 2014, 9 pgs.

Masood et al., "A Critical Review on Estimation of Rock Properties Using Sound Levels Produced During Rotary Drilling," International Journal of Earth Sciences and Engineering, Dec. 2012, pp. 1809-1814, ISSN 0974-5904, vol. 05, No. 06 (01), Indexed in Scopus Compendex and Geobase Elsevier, Chemical Abstract Services-USA, Geo-Ref Information Services-USA.

Vardhan, Harsha et al., "Application of Sound Level for Estimating Rock Properties," Noise Control, Reduction and Cancellation Solutions in Engineering, Dr Daniela Siano (Ed.), ISBN: 978-953-307-918-9, Mar. 2012, pp. 267-298, InTech. Available from: http://www.intechopen.com/books/noise-control-reduction-andcancellation-solutions-in-engineering/application-of-sound-level-for-estimating-rock-properties.

* cited by examiner

DRILLING NOISE CATEGORIZATION AND ANALYSIS

BACKGROUND

The process of drilling and completing a well is expensive and potentially unprofitable. Drilling components are subject to breakage or wearing out due to the harsh drilling environment. When drilling component failures occur, the drilling process is delayed as the entire drill string has to be removed to replace drilling components. Further, it may be necessary to fish out any mechanical parts left in the borehole that would interfere with drilling. With or without the occurrence of drilling component failures, the overall borehole trajectory of a completed drilling project may result in sub-optimal production. Perhaps only one out of six wells drilled can ever produce enough petroleum to recover costs and offer a profit. Even then, that one well must be completed properly, and completion costs are high. A bad completion can ruin a well, even if the overall borehole trajectory were to be optimal.

Many techniques have been developed to expedite drilling, to improve borehole trajectories, and to reduce completion costs. Some of these techniques involve collecting downhole data while drilling to prevent or quickly detect drilling anomalies. Other techniques involve steering the drill bit based on real-time downhole data so that the drill bit stays within a particular formation layer. Still other techniques involve logging downhole data during and/or after drilling to determine formation properties that affect how best to complete a well.

BRIEF DESCRIPTION OF THE DRAWINGS

Accordingly, there are disclosed in the drawings and the following description various methods and systems for categorization and analysis of drilling noise. In the drawings.

Figure 1:
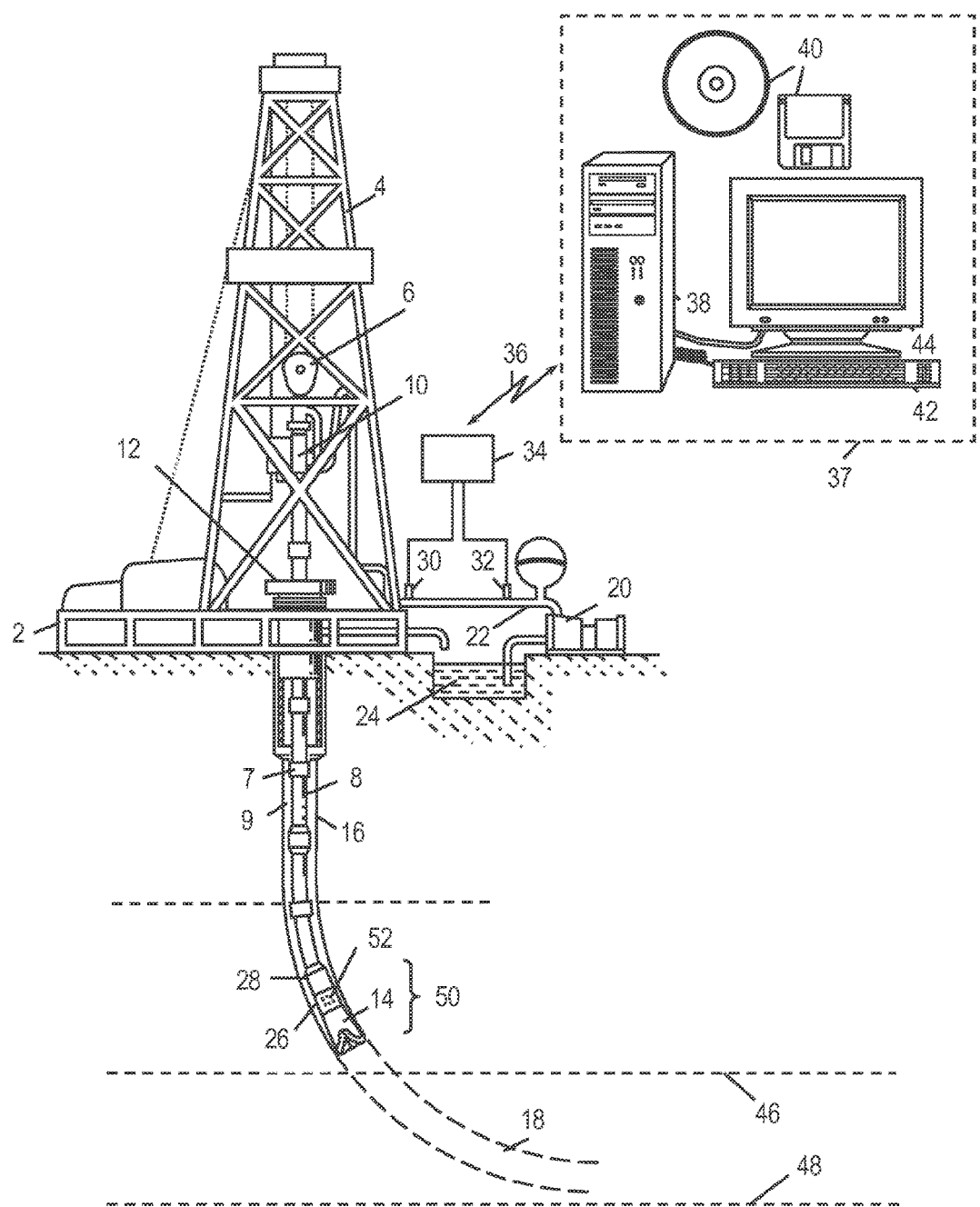
FIG. 1 is a schematic diagram showing an illustrative drilling environment.

It should be understood, however, that the specific embodiments given in the drawings and detailed description do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are various methods and systems for categorization and analysis of drilling noise. In at least some embodiments, drilling noise analysis involves categorizing different components of drilling noise recorded by a plurality of spaced acoustic transducers in a bottomhole assembly (BHA). To categorize different components of the recorded drilling noise, a comparative analysis of frequency and/or power spectrum components of drilling noise recorded by different acoustic transducers is performed. Such comparative analysis may be performed downhole or uphole. Example categories for drilling noise components include, but are not limited to, rock contact noise, mechanical noise, and fluid flow noise. Further, each drilling noise category may include sub-categories. For example, rock contact noise may be further categorized as stabilizer contact noise or bit contact noise. Also, mechanical noise may be further categorized as mud motor noise, contact velocity assembly noise, bearing assembly noise.

The categorized drilling noise components are used, in at least some embodiments, to derive data logs, plans, or control signals for directing drilling, processing, or telemetry options. Example data logs include drilling component wear logs, resistivity logs, and sonic slowness logs. Example plans include drilling plans, well completion plans, part management plans, drilling tool plans, and/or drilling noise processing plans. Such data logs, plans and/or related data may be displayed via a user interface (e.g., a computer) and/or may be stored for later analysis.

As needed, drilling noise categorization strategies may be updated as new information becomes available. For example, the categorization process may undergo training before, during or after a drilling project for which drilling noise is recorded and analyzed. Further, choices regarding the quantity, position, spacing, and wiring of acoustic transducers used to record a drilling sound may be updated over time as new information becomes available and/or as drilling technology progresses. Further, categorized drilling noise components may be correlated with other sensor-based data to derive data logs, plans, or control signals as described herein.

In accordance with at least some embodiments, an example system includes at least one processing unit and a BHA that includes or is in communication with the at least one processing unit. The BHA includes at least one drilling component and at least one acoustic transducer to convert drilling noise into one or more electrical signals. The at least one processing unit analyzes the one or more electrical signals or the related data to categorize different components of the drilling noise as rock contact noise and mechanical noise. The at least one processing unit derives a data log, a plan, or a control signal based on the categorized drilling noise components.

In accordance with at least some embodiments, an example method includes drilling a borehole and recording a drilling noise. The method also includes categorizing different components of the recorded drilling noise as rock contact noise and mechanical noise. The method also includes deriving a data log, a plan, or a control signal based on the categorized drilling noise components.

The disclosed methods and systems are best understood in an application context. Turning now to the figures, FIG. 1 shows an illustrative directional drilling environment that includes a drilling platform 2 supporting a derrick 4 with a traveling block 6 for raising and lowering a drill string 8. A top drive 10 supports and rotates the drill string 8 as it is lowered through the wellhead 12. A drill bit 14 is driven by a downhole motor and/or rotation of the drill string 8. As bit 14 rotates, it creates a borehole 16 that passes through various formations. The drill bit 14 is just one piece of a BHA 50 that typically includes one or more drill collars (thick-walled steel pipe) to provide weight and rigidity to aid the drilling process. Some of these drill collars may include a survey tool 26 to gather survey data such as position, orientation, weight-on-bit, borehole diameter, resistivity, etc. The tool orientation may be specified in terms of a tool face angle (rotational orientation), an inclination angle (the slope), and compass direction, each of which can be derived from measurements by magnetometers, inclinometers, and/or accelerometers, though other sensor types such as gyroscopes may alternatively be used. Further, drilling noise may be recorded from sensors 52 integrated with the BHA 50 and/or drill string 8.

In FIG. 1, the survey data collected by survey tool 26 as well as the drilling noise recorded by sensors 52 can be used to steer the drill bit 14 along a desired path 18 relative to bed boundaries 46 and 48 using any one of various suitable directional drilling systems that operate in real-time. Example steering mechanisms include steering vanes, a "bent sub," and a rotary steerable system. During drilling operations, a pump 20 circulates drilling fluid through a feed pipe 22 to top drive 10, downhole through the interior of drill string 8, through nozzles in drill bit 14, back to the surface via the annulus 9 around drill string 8, and into a retention pit 24. The drilling fluid transports cuttings from the borehole 16 into the pit 24 and aids in maintaining the borehole integrity. Moreover, a telemetry sub 28 coupled to the survey tool 26 can transmit survey data, recorded drilling noise, and/or related data to the surface via mud pulse telemetry. More specifically, for mud pulse telemetry, a transmitter in the telemetry sub 28 modulates a resistance to drilling fluid flow to generate pressure pulses that propagate along the fluid stream at the speed of sound to the surface. One or more pressure transducers 30, 32 convert the pressure pulses into electrical signal(s) for a signal digitizer 34. Note that other forms of telemetry exist and may be used to communicate signals from BHA 50 to the digitizer 34. Other telemetry techniques include, for example, acoustic telemetry, electromagnetic telemetry, or telemetry via wired drill pipe.

The digitizer 34 supplies a digital form of the received signals via a communications link 36 to a computer system 37 or some other data processing system. In at least some embodiments, the computer system 37 includes a processing unit 38 that performs analysis of recorded drilling noise and/or performs other operations by executing software or instructions obtained from a local or remote non-transitory computer-readable medium 40. The computer system 37 also may include input device(s) 42 (e.g., a keyboard, mouse, touchpad, etc.) and output device(s) 44 (e.g., a monitor, printer, etc.). Such input device(s) 42 and/or output device(s) 44 provide a user interface that enables an operator to interact with the BHA 50, surface/downhole directional drilling components, and/or software executed by the processing unit 38. For example, the computer system 37 may enable an operator to review or select: drilling options, survey data options (e.g., from survey tool 26), recorded drilling noise data (e.g., from sensors 52), data logs derived from the survey data and/or recorded drilling noise, plans derived from the survey data and/or recorded drilling noise (e.g., drilling plans, well completion plans, part management plans, drilling tool plans, drilling noise processing plans, etc.), drilling status charts, waypoints, a desired borehole path, an estimated borehole path, processing options, telemetry options and/or to perform other tasks. In at least some embodiments, the recorded drilling noise is categorized and analyzed as described herein.

Figure 2A:
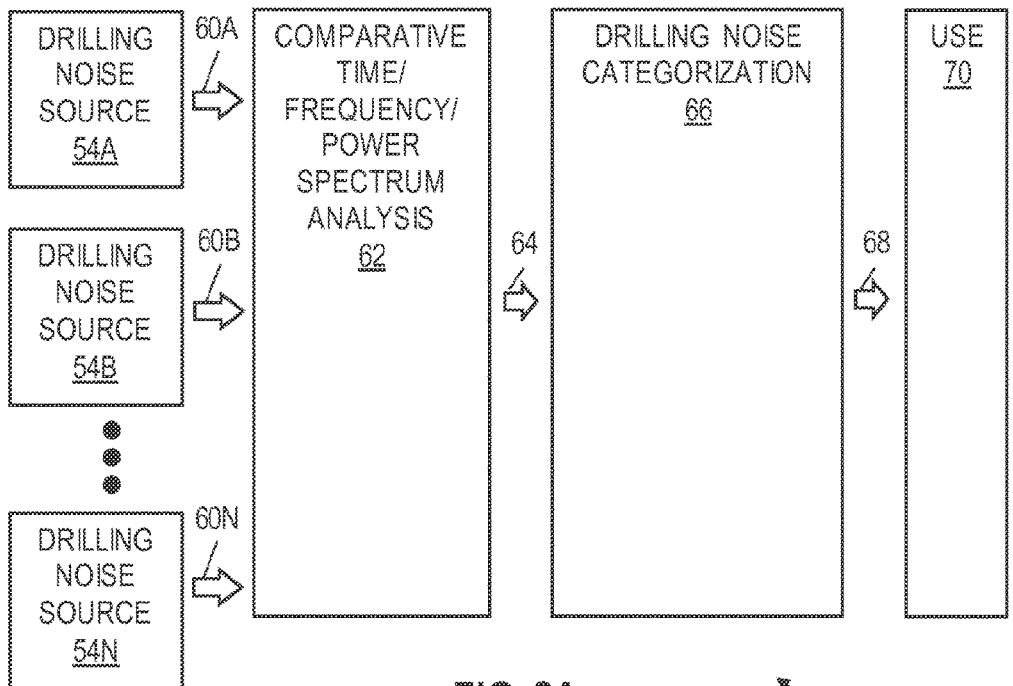
FIGS. 2A and 2B are block diagrams showing illustrative drilling noise analysis models.
Figure 2B:
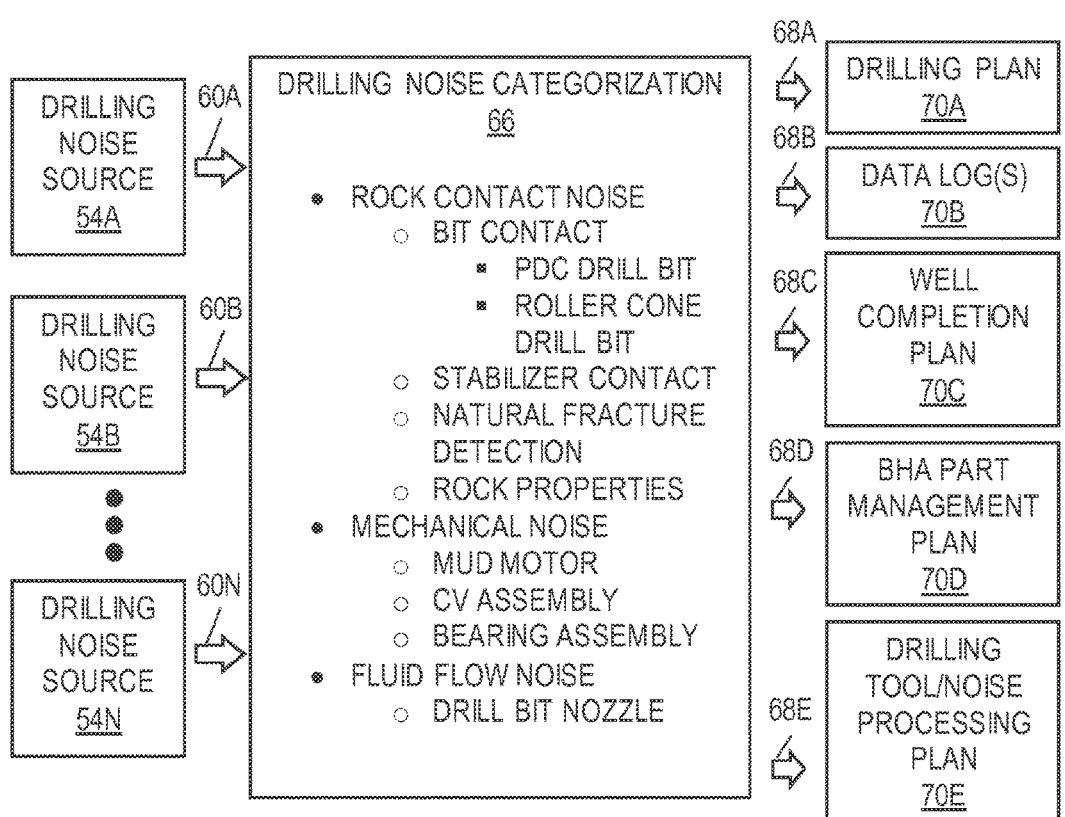

FIGS. 2A and 2B show illustrative drilling noise analysis models. In FIG. 2A, model 100 assumes a plurality of drilling noise sources 54A-54N, each producing a recordable sound 60A-60N. The recordable sounds 60A-60N are compared at comparative analysis block 62, where time components, frequency components, and intensity components of each sound 60A-60N can be used to distinguish between the different drilling noise sources 54A-54N. The output 64 of the comparative analysis block 62 is used to categorize drilling noises at block 66. The categorization process of block 66 may apply predetermined rules that associate known or modeled drilling noise sources with the recorded sounds 60A-60N. One example categorization technique involves developing a library of "signatures" for drilling noise sources and matching recorded sounds to one of the drilling noise signatures. Additionally or alternatively, categorization may involve identifying a known or modeled spatial relationship between drilling noise sources. In such case, a spatial relationship identified in recorded sounds can be used to correlate the recorded sounds with drilling noise sources. Further, the categorized drilling noise components may also be correlated with a frequency and intensity of vibration that is occurring at or near a particular BHA part.

In at least some embodiments, the comparative analysis of block 62 and/or the categorization of block 66 may involve adaptive learning techniques, where correlations between available inputs and a known target attribute are identified and are used to train a predictor that interprets subsequent inputs relative to the target attribute used for training. Such training can be performed one time or many times and is helpful as long as the identified correlations are accurate. For example, available inputs for drilling noise analysis may include time components, frequency components, intensity components, or derivatives for individual acoustic transducers. Further, available inputs may include comparative time components, comparative frequency components, comparative intensity components, or comparative derivatives corresponding to spaced acoustic transducers. Further, available inputs may include the position of acoustic transducers relative to each other and to drilling components. Meanwhile, the target attribute may correspond to a drilling noise source and/or a location of the drilling noise source. Various techniques for training a predictor are known in the literature and are suitable for use in blocks 62, 66, or training module 210 (see FIG. 5). In their various ways, such techniques extract the useful correlations between the input attributes and the target attribute and embody them in a model that extrapolates from new input attribute values to predict the target attribute. See, e.g., the literature on adaptive filtering, system identification, neural networks, pattern identification, and principle component analysis. Such literature further includes suitable techniques for selecting a proper model complexity and an optimal subset of input attributes from the available input attributes. Specifically contemplated techniques include the use of support vector machines, radial basis neural networks, and regression trees. Various numbers and combinations of input attributes may be evaluated on the basis of their root mean square error (RMSE) predictive performances, with a built-in complexity-based penalty to prevent over-fitting the data. U.S. Pat. Nos. 7,404,456 and 7,357,197 describe neural network options for drilling noise analysis that may be modified to identify or isolate a noise source and/or to categorize drilling noise as described herein.

The predictor may be trained based only on the attributes for the current segment of the drilling process ("individual mode"), or may be trained in a cumulative fashion based on the data from all the preceding segments as well ("cumulative mode"). In some contemplated embodiments, multiple predictors are trained (e.g., using both individual and cumulative modes for different subsets of input attributes) and an optimal predictor is selected. In some further contemplated embodiments, the outputs of multiple models may be combined to predict the desired target attribute in an ensemble modeling mode.

In the drilling noise analysis model 100, the categorized drilling noise components 68 determined at block 66 are used at block 70. For example, the categorized drilling noise components 68 may be used to derive data logs, to derive one or more control signals to adjust drilling, processing, or telemetry options, to derive a well completion plan or adjust well completion options, to derive a BHA part management plan, to derive a drilling tool design plan, and/or to derive a drilling noise processing plan.

The drilling noise analysis model 102 of FIG. 2B shows an example of specific categorizations provided by block 66. In at least some embodiments, drilling noise components are categorized as rock contact noise, mechanical noise, or fluid flow noise. The drilling noise components categorized as rock contact noise can further be categorized as bit contact noise or stabilizer contact noise. The drilling noise components categorized as bit contact noise may be monitored or analyzed, for example, to estimate the changing condition of a polycrystalline diamond compact (PDC) drill bit or roller cone drill bit. In at least some embodiments, a processing unit monitors the amplitude level or amplitude derivative for particular frequency components categorized as bit contact noise to estimate a drill bit's condition or life expectancy, and/or to identify drill bit anomalies. The monitoring window size (the event or pattern size) for estimating a drill bit condition or other attributes from the amplitude level or amplitude derivative of particular bit contact noise frequency components is expected to span several seconds or minutes.

Drilling noise components categorized as bit contact noise may additionally or alternatively be monitored or analyzed to identify the location of natural fractures and/or to identify rock properties such as brittleness and hardness as a function of position. In at least some embodiments, a processing unit monitors the amplitude level or amplitude derivative for particular frequency components categorized as bit contact noise to identify natural fractures, brittleness, hardness, and/or other rock properties. The monitoring window size (the event or pattern size) for estimating rock properties from the amplitude or amplitude derivative of particular bit contact noise frequency components is expected to span a time suitable for known or modeled rock destruction for solid rock and fractured rock. For example, rock destruction events or patterns related to bit contact noise may be based at least in part on the rotation speed of the drill bit and the number of contact points on the drill bit (e.g., the number of nubs or cutters).

Similarly, drilling noise components categorized as stabilizer contact noise may be useful for identifying natural fractures, brittleness, hardness and/or other rock properties. The monitoring window size (the event or pattern size) for estimating rock properties from the amplitude or amplitude derivative of particular stabilizer contact noise frequency components is expected to span a time suitable for known or modeled rock destruction for solid rock and fractured rock. Rock destruction events or patterns related to stabilizer contact noise may be based at least in part on the rotation speed of the drill string and the number of contact points on the stabilizer.

In at least some embodiments, drilling noise components categorized as mechanical noise can further be categorized as mud motor noise, constant velocity (CV) assembly noise, or bearing assembly noise. In such case, a processing unit may monitor the amplitude level or amplitude derivative for particular frequency components categorized as mud motor noise to identify a mud motor's condition, life expectancy, and/or mud motor anomalies. The monitoring window size (the event or pattern size) for identifying a mud motor condition or other attributes from the amplitude or amplitude derivative of particular mud motor noise frequency components is expected to span a time suitable for known or modeled stator/rotor contact events or patterns. Such stator/rotor contact events or patterns may be based at least in part on the rotation speed of the drill bit, a drilling fluid pressure, drilling fluid flow attributes, and/or other parameters.

Further, a processing unit may monitor the amplitude level or amplitude derivative for particular frequency components categorized as CV assembly noise to identify a CV assembly's condition, life expectancy, and/or CV assembly anomalies. The monitoring window size (the event or pattern size) for identifying a CV assembly condition or other attributes from the amplitude or amplitude derivative of particular CV assembly noise frequency components is expected to span a time suitable for known or modeled CV assembly part contact events or patterns. Such CV assembly part contact events or patterns may be based at least in part on the rotation speed of the drill bit, a drilling fluid pressure, drilling fluid flow attributes, and/or other parameters.

Further, a processing unit may monitor the amplitude level or amplitude derivative for particular frequency components categorized as bearing assembly noise to identify a bearing assembly's condition, life expectancy, and/or bearing assembly anomalies. The monitoring window size (the event or pattern size) for identifying a bearing assembly condition or other attributes from the amplitude or amplitude derivative of particular bearing assembly noise frequency components is expected to span a time suitable for known or modeled bearing assembly part contact events or patterns. Such bearing assembly part contact events or patterns may be based at least in part on the rotation speed of the drill bit, a drilling fluid pressure, drilling fluid flow attributes, the number of bearings, and/or other parameters.

Drilling noise components categorized as fluid flow noise may be monitored or analyzed, for example, to estimate the changing condition of drill bit nozzles. In at least some embodiments, a processing unit monitors the amplitude level or amplitude derivative for particular frequency components categorized as fluid flow noise to estimate a nozzle's condition or life expectancy, and/or to identify nozzle anomalies. The monitoring window size (the event or pattern size) for estimating a nozzle condition or other attributes from the amplitude level or amplitude derivative of particular fluid flow noise frequency components is expected to span a time suitable for known or modeled nozzle flow events or patterns. Such nozzle flow events or patterns may be based at least in part on the rotation speed of the drill bit, a drilling fluid pressure, drilling fluid flow attributes, and/or other parameters. Fluid flow noise may also be detectable at other points along a BHA, and may be used to identify fluid flow rates through the BHA, drilling fluid attributes (e.g., density, temperature), fluid flow anomalies, and/or other attributes.

Figure 7A:
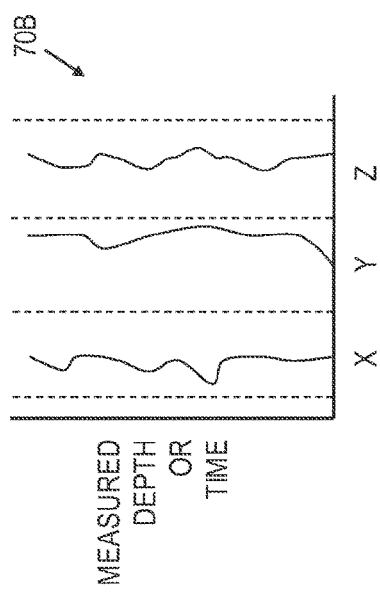
FIGS. 7A-7E are diagrams showing example data logs or plans derived from categorized drilling noise.

For the drilling noise analysis model 102 of FIG. 2B, different sets of categorized drilling noise components 68A-68E are used to derive different data logs or plans 70A-70E, which can be visualized or stored for later analysis. Further, different sets of categorized drilling noise components 68A-68E may be used to derive control signals for directing drilling options, processing options, and/or telemetry options. As shown, one set of categorized drilling noise components 68A is used to obtain a drilling plan 70A. For example, the set of categorized drilling noise components 68A used to obtain drilling plan 70A may include bit contact noise components that identify a drill bit condition and/or mechanical noise components that identify a mud motor condition, a CV assembly condition, or a bearing assembly condition. FIG. 7A shows a representative drilling plan 70A, which may direct a drilling operator or drilling equipment to stop, to go, or to remove the drill string from a borehole being drilled. Further the drilling plan 70A may provide a drilling operator or drilling equipment with values or updates regarding one or more drilling parameters such as rotations-per-minute (RPM), weight-on-bit, torque, rate of penetration, drilling direction, drilling fluid options (e.g., pressure, density, etc.). Such drilling plans may be updated periodically and/or may specify information for different borehole segments during the drilling process. In at least some embodiments, control signals for directing drilling options (e.g., RPM, weigh-on-bit, rate of penetration, drilling direction, drilling fluid options, etc.) may be derived in addition to or instead of the drilling plan 70A.

Figure 7B:
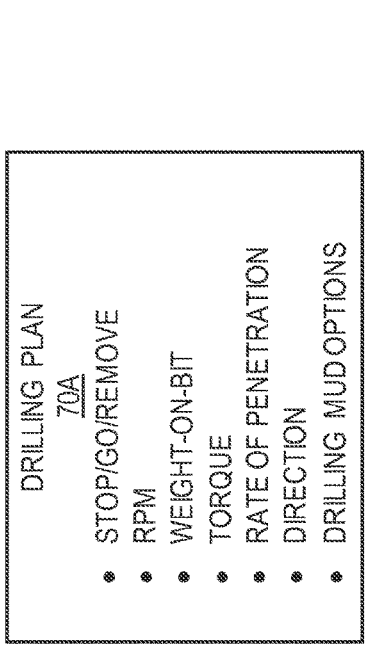

Another set of categorized drilling noise components 68B is used to derive data logs 70B. For example, the set of categorized drilling noise components 68B used to derive data logs 70B may include bit contact noise components and/or stabilizer contact noise components that identify natural fractures and/or other rock properties. Alternatively, the set of categorized drilling noise components 68B used to derive data logs 70B may include bit contact noise components that identify a drill bit condition and/or mechanical noise components that identify a mud motor condition, a CV assembly condition, or a bearing assembly condition. FIG. 7B shows representative data logs for parameters X, Y, and Z plotted as a function of measured depth or time. The measurement units and ranges corresponding to parameters X, Y, Z may vary. Example logs include component wear as a function of time, resistivity as a function of measured depth, sonic slowness as a function of measured depth, rock hardness as a function of measured depth, etc. Such data logs can be derived from the categorized drilling noise. In some embodiments, neural networks or other learning algorithms are employed to determine the correlation between categorized drilling noise and log values. It should be appreciated that deriving data logs from categorized drilling noise may involve analysis of other available log data. Some LWD tools employed with a BHA may to collect gamma ray logs, nuclear magnetic resonance (NMR) logs, electromagnetic logs, seismic logs. In such case, the categorized drilling noise may be used to supplement or adjust other logs and/or to derive new logs that correlate different types of data together. For example, deriving a resistivity log from categorized drilling noise may involve identifying a rock type using the categorized drilling noise and identifying the amount of water or hydrocarbons in the identified rock type using an NMR or gamma ray log. The combination of rock type identifying and fluid saturation identification may be used to estimate resistivity without use of a resistivity logging tool. Similarly, a sonic slowness log may be derived by identifying a rock type or rock hardness and/or identifying fluid saturation.

Figure 7C:
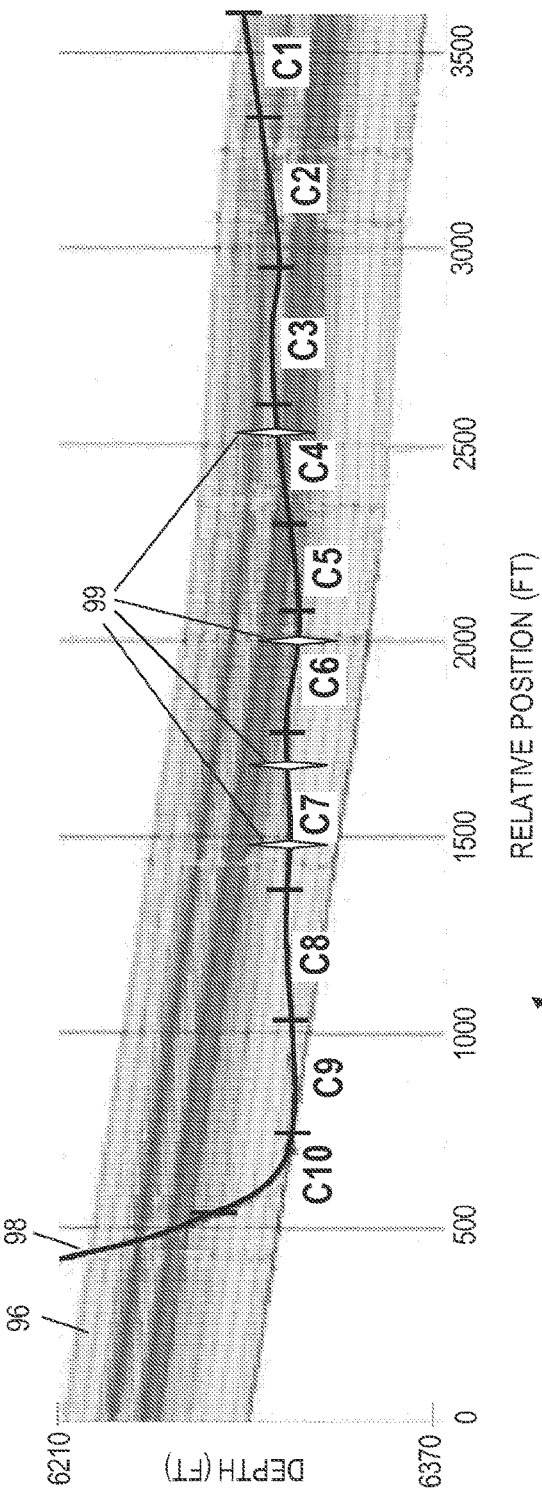
Figure 7E:
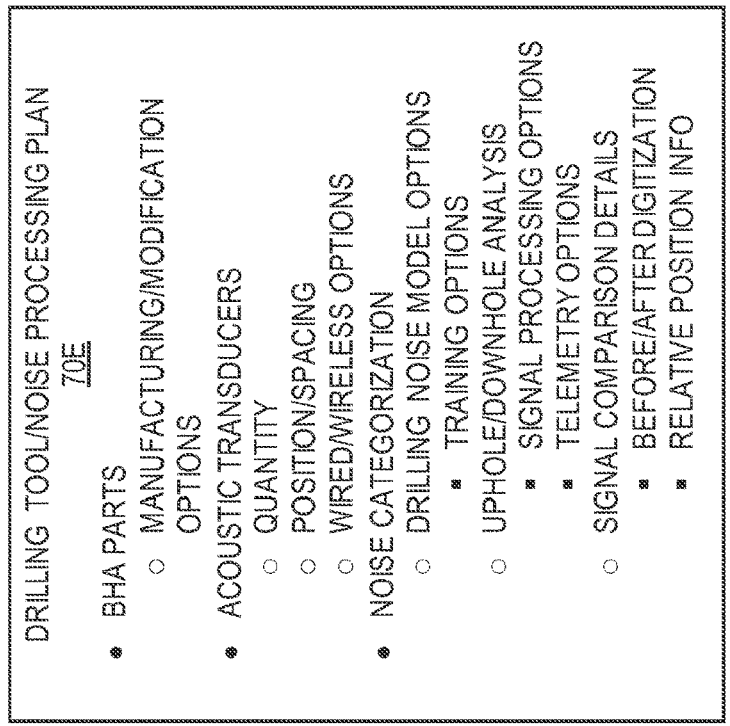

Another set of categorized drilling noise components 68C is used to obtain a well completion plan 70C. For example, the set of categorized drilling noise components 68C used to obtain well completion plan 70C may include bit contact noise components and/or stabilizer contact noise components that identify natural fractures and/or other rock properties. FIG. 7C shows a representative well completion plan 70C representing a well 98 traversing a formation layer 96, where darker areas of formation layer 96 have a particular formation property (e.g., higher clay content). Associated with the well 98 are ten completion intervals labeled C1-C10, where some of the completion intervals are closer to or extend through areas with the particular formation property (i.e., C2-C6 are closer to the darker areas of formation layer 96 than C1 and C7-C10). In at some embodiments, the location of natural fractures 99 and/or areas with the particular formation property are identified by categorizing and analyzing drilling noise as described herein. With the natural fracture information and/or formation property information provided in the well completion plan 70C, decisions can be made regarding the number of completion intervals to be used for formation layer 96, which completion intervals should be developed, how much development is needed for particular completion intervals, where to perform fracturing operations, etc. While variations are possible, well completion plans such as well completion plan 70C enable drilling or completion plan adjustments to avoid uneconomical drilling/well completion efforts and to otherwise maximize the net present value of an asset.

Figure 7D:
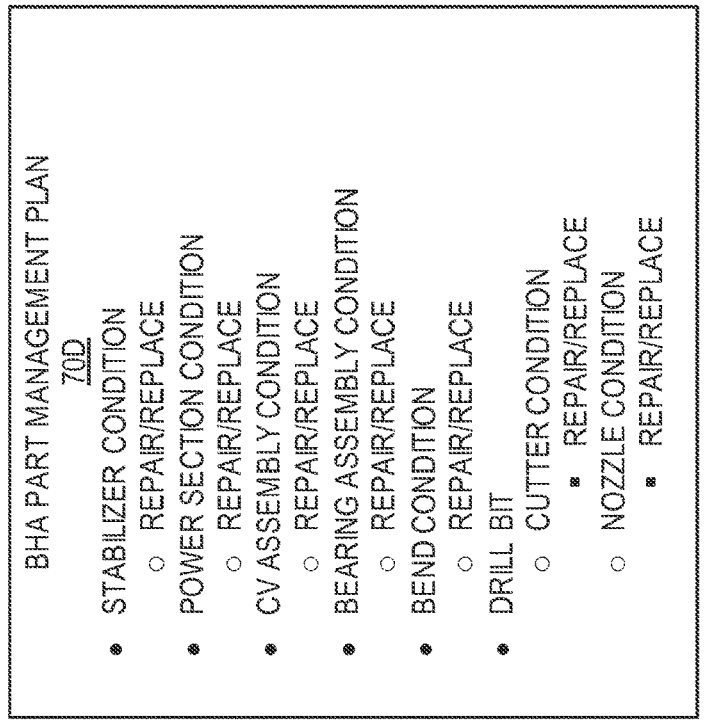

Another set of categorized drilling noise components 68D is used to obtain a BRA part management plan 70D. For example, the set of categorized drilling noise components 68D used to obtain BHA part management plan 70D may include bit contact noise components, stabilizer contact noise components, and/or mechanical noise components (e.g., power section noise components, CV assembly noise components, bearing assembly noise components) that identify BRA part failure or degradation. FIG. 7D shows a representative BHA part management plan 70D that displays, for example, a stabilizer condition indicator, a power section condition indicator, a CV assembly condition indicator, a bearing assembly condition indicator, a bend condition indicator, a drill bit condition indicator, a cutter condition indicator, and/or a nozzle condition indicator. In at least some embodiments, a repair or replace indicator can additionally or alternatively be provided for each BHA part being monitored. For example, the repair indicator may provide a projected timeline regarding when a repair will be needed for a BHA part. Similarly, the replace indicator may provide a projected timeline regarding when a replacement will be needed for a BHA part. Cost estimates and availability estimates may also be displayed for repair or replacement options.

Figure 3:
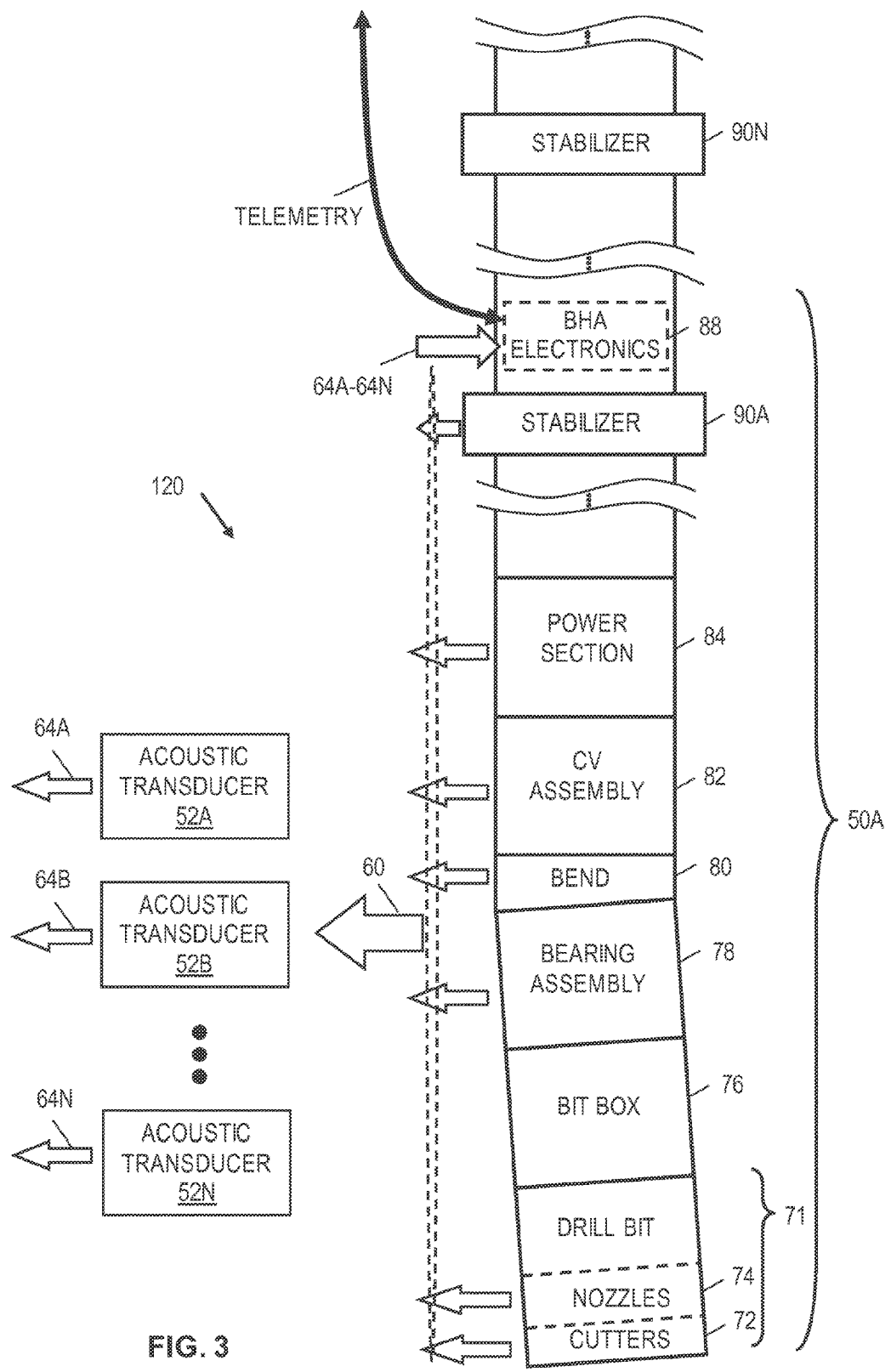
FIG. 3 is a schematic diagram showing an example bottomhole assembly (BHA).

Another set of categorized drilling noise components 68E is used to obtain a drilling tool or drilling noise processing plan 70E. For example, the set of categorized drilling noise components 68E used to obtain a drilling tool or drilling noise processing plan 70E may include any drilling noise components determined to be indistinguishable or otherwise below a quality threshold. As shown, the plan 70E may include information regarding manufacturing options or modification options for BHA parts such that the BHA parts are compatible with spaced acoustic transducers to enable drilling noise categorization and analysis. Additionally or alternatively, the plan 70E may include information regarding the number of acoustic transducers, the position of acoustic transducers, the spacing of acoustic transducers, wired options for acoustic transducers, and wireless options for acoustic transducers relative to existing or modeled BHA parts. Additionally or alternatively, the plan 70E may include information regarding drill noise categorization options. For example, the plan 70E may specify drilling noise model options and training options for each drilling noise model option. Further, the plan 70E may specify uphole processing versus downhole processing options for drilling noise categorization and analysis. Further, requirements for signal processing (e.g., related to comparative time/frequency/power spectrum analysis) and telemetry (e.g., uphole/downhole data rate and bandwidth) may be specified for different drilling noise categorization and analysis options. Further, signal comparison details may be specified regarding how to process the signals output from acoustic transducers. For example, options related to comparing signals before or after digitization may be specified. Further, options regarding which signals are to be compared and the relative position of acoustic transducers relative to each other and/or to BHA parts may be specified. In at least some embodiments, control signals for directing processing/telemetry options (e.g., how much processing to perform downhole/uphole, drilling noise components to be filtered, drilling noise components to be conveyed uphole, data compression options, drilling noise component to consider for deriving data logs, plan, or control signals, etc.) may be derived in addition to or instead of a drilling tool plan or drilling noise processing plan 70E. FIG. 3 is a schematic diagram showing an example BHA 50A. The BHA 50A of FIG. 3 may correspond to, for example, the BHA 50 mentioned for the drilling environment of FIG. 1. As shown, the BHA 50A includes a drill bit 71 with cutters 72 and nozzles 74. The cutters 72 cut, scrape, or otherwise break down rock. Meanwhile, the nozzles 74 provide an outlet for drilling fluid to carry away rock as it is broken down by the cutters 72. The bit box 76 provides a coupling interface between the drill bit 71 and bearing assembly 78. Other components of BHA 50A include bend 80, CV assembly 82, power section 84, and BHA electronics 88. Together the bit box 76, the bearing assembly 78, the bend 80, the CV assembly 82, and the power section 84 operate to spin the drill bit 71 as well as transfer a downward and/or sideways force to the drill bit 71. In at least some embodiments, the BHA 50A may also include one or more stabilizers 90A to improve centering of the BHA 50A in a borehole. Additional stabilizers (up to stabilizer 90N) may be distributed along BHA 50A and a drill sting.

During drilling operations, various components of BHA 50A can be drilling noise sources. For example, drilling noise may be generated by cutters 72 in contact with rock or by nozzles 74 as drilling fluid exits. Further, the bearing assembly 78 may generate mechanical noise as its bearings move and contact each other and/or a bearing track. Further, bend 80 may contact rock at times, especially if the drilling direction is being adjusted. The CV assembly 82 may also generate mechanical noise as its part move and contact each other and/or a housing. Further, the power section 84 may generate noise as fluid flow causes a rotor to move relative to stator causing contact between the rotor and stator. The fluid flow itself through different components of BHA 50A may also generate noise. Further, stabilizers 90A-90N may generate noise due to contact with a surrounding formation or casing.

The drilling noise from different components of BHA 50A is represented as arrow 60, and is recorded by a plurality of spaced acoustic transducers 52A-52N (two or more). In accordance with at least some embodiments, the spacing for acoustic transducers 52A-52N and the digitization resolution is sufficient to enable the recorded signals to be distinguished as a function of time. As an example, if acoustic transducer 52A is positioned at CV assembly 82 and acoustic transducer 52B is positioned at bit box 76, drilling noise from the drill bit 71 will arrive to acoustic transducer 52B before it arrives to acoustic transducer 52A. On the other hand, drilling noise from power section 84 or CV assembly 82 will arrive to acoustic transducer 52A before it arrives to acoustic transducer 52B. Thus, the spaced acoustic transducers 52A-52N, where their spacing relative to each other and their position relative to BHA components is known, enable recorded drilling noises to be correlated with different BHA components and/or otherwise categorized as described herein. The frequency components and amplitude of recorded drilling noise can also be used to categorize drilling noises and correlate recorded drilling noise with different BHA components. The categorization and analysis of drilling noise involves conveying electronic signals 64A-64N output from the spaced acoustic transducers 52-A52N to BHA electronics 88. To convey the electronic signals 64A-64N from the spaced acoustic transducers 52A-52N to BHA electronics 88 wired or wireless connections are employed.

Figure 4B:
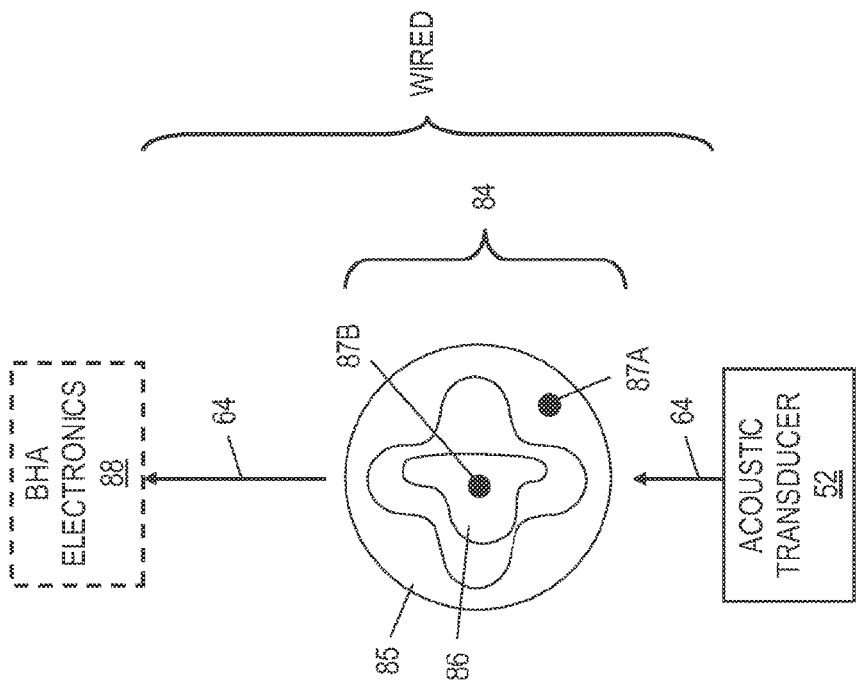
FIGS. 4A and 4B are schematic diagrams showing wireless and wired configurations for conveying an electrical signal from an acoustic transducer to BHA electronics.
Figure 4A:
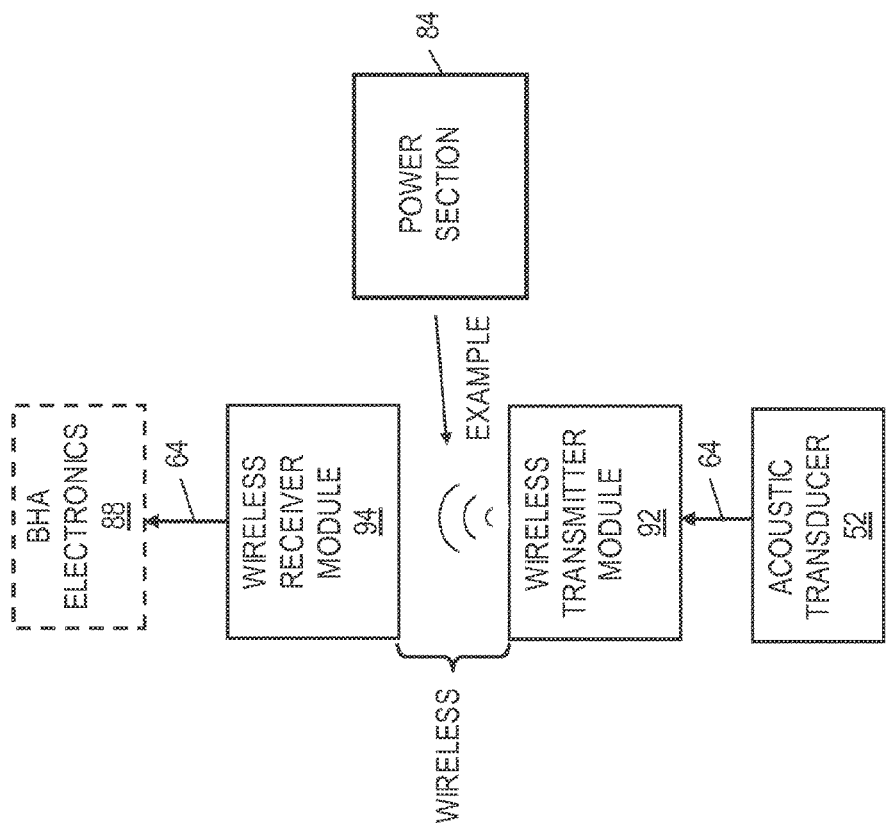

FIG. 4A shows a wireless configuration for conveying an electrical signal 64 from an acoustic transducer 52 to BHA electronics 88. In FIG. 4A, the electrical signal 64 (e.g., representing drilling noise recorded by acoustic transducer 52) is output from an acoustic transducer 52 wired to a wireless transmitter module 92. The wireless transmitter module 92 communicates wirelessly with a wireless transceiver module 94 wired to BHA electronics 88. As an example, the wireless transmitter module 92 and the wireless receiver module 94 may be positioned on opposite sides of the power section 84. Without limitation to other embodiments, the wireless transmitter module 92 and the wireless receiver module 94 may correspond to near-field electromagnetic communication devices such as RuBee® devices, i.e., devices that comply with IEEE STD 1902.1™-2009 ("IEEE Standard for Long Wavelength Wireless Network Protocol"), and are optionally augmented with additional features to make them more suitable for downhole use. Off-the-shelf communication devices (after having been tested for high-temperature operation and longevity) may, for example, be packaged to protect against high pressure and high-vibration environments, potentially equipped with larger batteries or kinetic energy sources, optionally attached to a larger antenna, and fitted to a means for securing and protecting the device. Further, some reprogramming of the device firmware may be employed to provide an efficient communication relay protocol. Unlike existing techniques which require contact or close proximity for wireless communications, near-field communication devices can be spaced at least 30 centimeters apart, with more typical communications ranges expected to be 3-5 meters when relying on integrated antennas or 5-10 meters or more when larger antennas (such as a coil that extends around enclosing the tubing) are employed. Moreover, it is expected that the performance of such devices will be largely unaffected by the presence of metal and other conductive materials.

In at least some embodiments, the antenna for a near-field electromagnetic communications device corresponds to an internal or external insulated conductor, pair of insulated conductors, or toroid, that generates an electromagnetic field in the 30 kHz-450 kHz range. The near-field electromagnetic communications device (with or without an external antenna) can be embedded in a recess included with or added to a BHA part, adhered to the surface of a BHA part with adhesive, and/or secured by a sleeve or band. In at least some of these variations, near-field electromagnetic communications devices are attached to stock BHA parts without structural modification to the BHA parts.

FIG. 4B shows a wired configuration for conveying an electrical signal 64 from an acoustic transducer 52 to BHA electronics 88. In FIG. 4B, the electrical signal 64 is output from an acoustic transducer 52 wired to BHA electronics 88, where at least part of the wiring passes through power section 84. In at least some embodiments, the power section 84 includes a stator 85 with a hole 87A to allow wiring to pass through the stator 85. Alternatively, the power section 84 includes a rotor 86 with a hole 87B to allow wiring to pass through the rotor 86.

Figure 5:
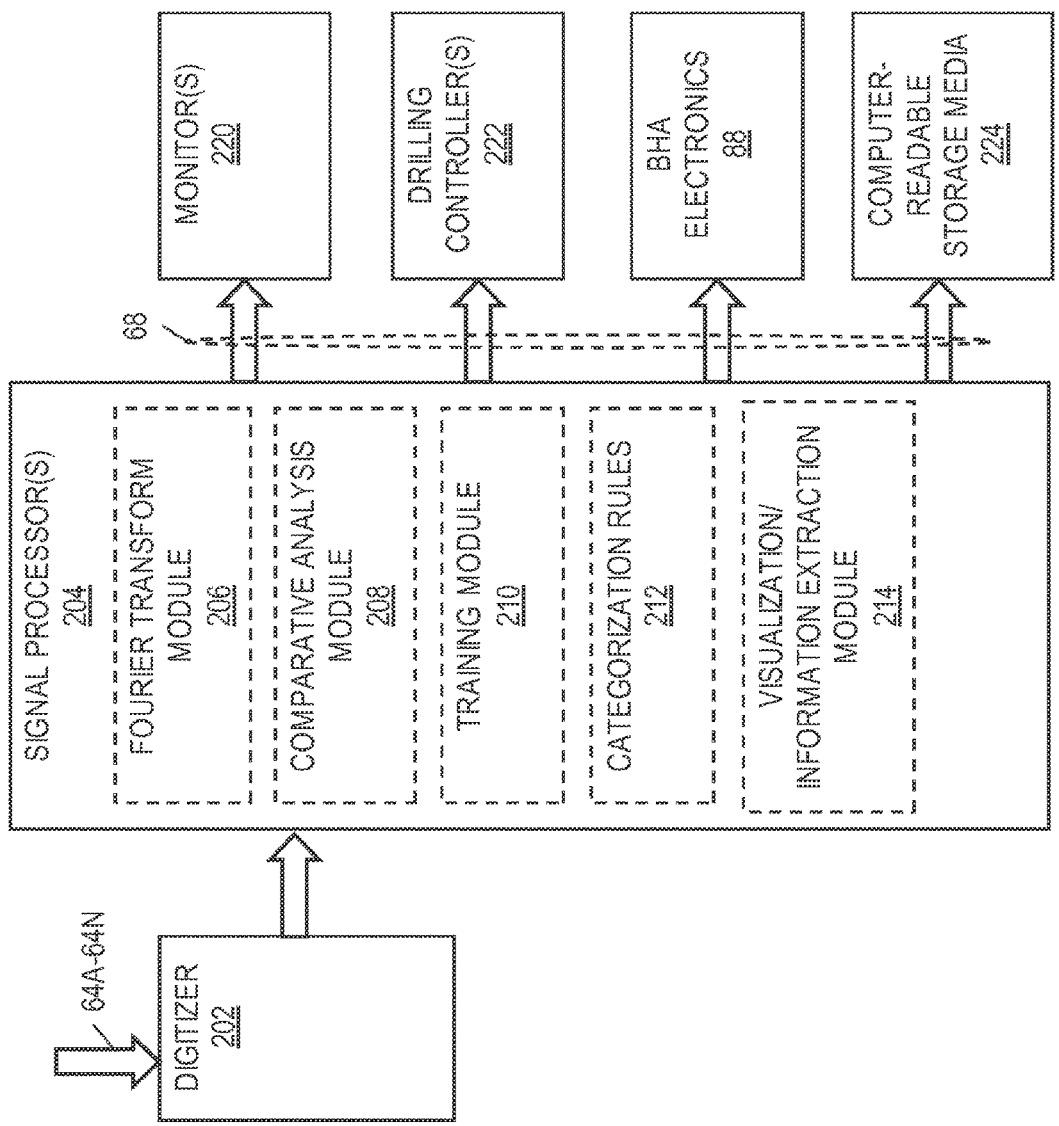
FIG. 5 is a block diagram showing drilling noise analysis components.

FIG. 5 is a block diagram showing drilling noise analysis components. As shown in FIG. 5, the electrical signals 64A-64N representing recorded drilling noise are input to a digitizer 202. Thereafter, at least some of the digitized signals are provided to signal processor(s) 204, which may perform various operations using a Fourier transform module 206, a comparative analysis module 208, a training module 210, categorization rules 212, and/or a visualization/information extraction module 214. The signals processor(s) 204 may correspond to one or more computers at earth's surface (e.g., computer system 37). Additionally or alternative, at least one signal processor 204 may be included with BHA electronics 88. Different operations related to each of the Fourier transform module 206, the comparative analysis module 208, the training module 210, categorization rules 212, and/or the visualization/information extraction module 214 can be performed by signal processors 204 located downhole and/or signal processors 204 at earth's surface.

In at least some embodiments, the Fourier transform module 206 uses Fast Fourier Transform (FFT) operations to extract frequency spectrum information for recorded drilling noises represented by the digitized signals. The amplitude of drilling noises at particular frequencies may also be obtained. The comparative analysis module 208 compares the digitized signals and/or the related data obtained using Fourier transform module 206. For example, the comparative analysis module may determine time differences, frequency differences, and amplitude differences between digitized signals and/or their related data.

The training module 210 receives a target attribute and particular components of the digitized signals, the related data, and/or comparative analysis results as inputs for a prediction model to be trained, where the target attribute can be correlated with one or more of the inputs provided to the prediction model. An example target attribute includes identifying a particular BHA part as a noise source and/or identifying a particular drilling noise. Once trained, the prediction model receives subsequent inputs and predicts a target attribute or at least identifies a level of correlation between the inputs and at least one target attribute used for training.

The categorization rules 212 correspond to predetermined rules or learned rules for identifying drilling noise as coming from a particular BHA part and/or identifying a particular drilling noise. The categorization rules 212 may categorize drilling noise based on the digitized signals, the related data, and/or comparative analysis results. Example categories were described previously when describing drilling noise categorization block 66.

It should be appreciated that some filtering or processing of the electrical signals 64A-64N may be performed before digitization and digital processing. For example, the electrical signals 64A-64N can be compared and/or their differences obtained before digitization. Further, it should be appreciated that the acoustic transducers 52A-52N may vary with respect to their sensitivity to drilling noise and particular frequency bands. Further, different gain or amplifier arrangements may be provided for different acoustic transducers 52. Further, in at least some embodiments, different types of acoustic transducers 52 are employed. Example acoustic transducers include, but are not limited to, microphones, hydrophones, and sound intensity probes. Some of the components used for acoustic transducers (to convert sound waves to electrical signals) include magnets, electromagnets, piezoelectric elements, micro-electro-mechanical (MEMS) elements, electrostrictive elements, magnetostrictive elements, ceramic elements, and flexible membranes.

In at least some embodiments, the acoustic transducers 52A-52N may be calibrated before, during, or after drilling operations. To calibrate the acoustic transducers 52A-52N, one or more known sound sources are triggered to enable each acoustic transducers 52A-52N response to a known sound to be identified and used to update how the electrical signals 64A-64N output from the acoustic transducers 52A-52N will be interpreted. By performing the calibration in the downhole environment, changes to the response of the acoustic transducers 52A-52N due to vibration, high pressure, high temperatures, or other drilling environment characteristics can be accounted for. Further, a calibration routine for the acoustic transducers 52A-52N may include comparing the response of the acoustic transducers 52A-52N in the downhole environment while drilling versus their response when drilling is stopped. (The BHA may be equipped with a known sound source that can be triggered while drilling or when drilling is stopped).

The visualization/information extraction module 214 receives categorized drilling noise information and prepares output signals suitable for monitor(s) 220, drilling controller(s) 222, BHA electronics 88, and/or computer-readable storage media 224. For example, the signal processor(s) 204 may direct the monitor(s) 220 may display data logs or plans 70A-70E as described herein. Additionally or alternatively, the signal processor(s) 204 may direct the drilling controller(s) 222 to adjust drilling parameters such as rotation rate, drilling fluid pressure, torque, weigh-on-bit, and/or drilling direction. Additionally or alternatively, signal processor(s) 204 may direct the BHA electronics 88 to adjust how recorded drilling sound is analyzed or categorized. Further, the amount of processing performed by BHA electronics 88 may be adjusted. Further, the filtering or data compression performed by the BHA electronics 88 may be adjusted. For example, some of the drilling noise components that were previously considered for categorization and analysis may be filtered out in response to control signals received from the signal processor(s) 204. Additionally or alternatively, some of the drilling noise components that were not considered for categorization and analysis may be considered in response to control signals received from the signal processor(s) 204. The computer-readable storage media 224 enables categorized drilling noise components and/or related data to be conveyed as needed to one or more computers for later analysis. For example, some of the details in data logs or plans 70A-70E may be available in real-time or near-real-time during drilling operations, while other details are analyzed later as needed.

Figure 6:
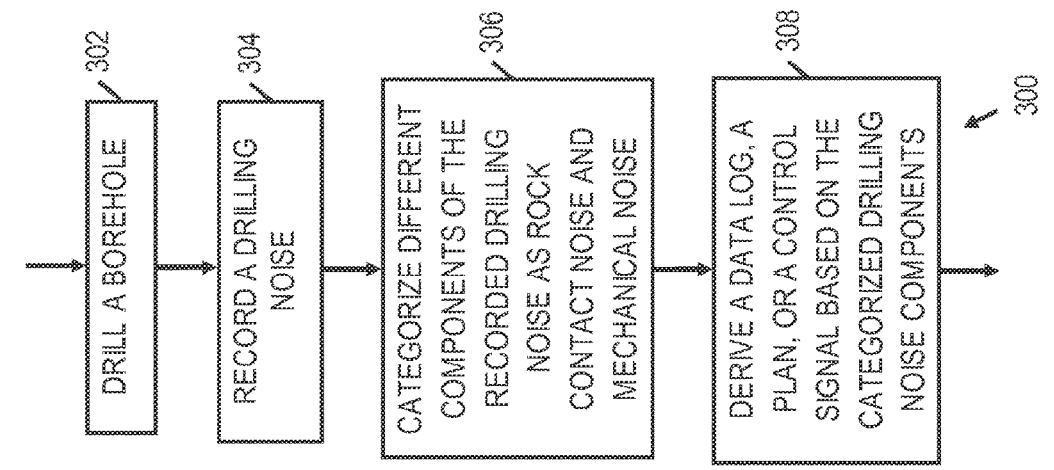
FIG. 6 is a flowchart showing an illustrative drilling noise analysis method.

FIG. 6 is a flowchart showing an illustrative drilling noise analysis method 300. In method 300, a borehole is drilled (block 302) and a drilling noise is recorded (block 304). As described herein, the drilling noise may be recorded by a plurality of spaced acoustic transducers integrated with or attached to different BHA parts. At block 306, different components of the drilling noise are categorized as rock contact noise and mechanical noise. At block 308, a data log, a plan, or a control signal is derived based on the categorized drilling noise components. Example data logs or plans 70A-70E are described in FIGS. 7A-7E and were discussed previously for FIG. 2B. Example data logs may track formation properties or drilling component wear. Meanwhile, example plans may be used to direct drilling operations, to direct well completion operations, and/or may be used validate or disprove theories regarding BHA performance. In addition to or instead of deriving one or more data logs or plans, the method 300 may include outputting control signals to direct or adjust the drilling options of drilling controller(s) 222 and/or telemetry options, filtering options, processing options, and/or compression options for BHA electronics 88. Additionally or alternatively, the method 300 may store categorized drilling noise components or related data to a computer-readable storage media 224 (e.g., a non-volatile memory). The stored information can be accessed as needed via a network and/or the computer-readable storage media 224 can be transported from one location to another to enable access to the categorized drilling noise components or related data.

Embodiments disclosed herein include:

A: A system that comprises at least one processing unit and a BHA that includes or communicates with the at least one processing unit. The BHA comprises at least one drilling component and at least one acoustic transducer to convert drilling noise into one or more electrical signals. The at least one processing unit analyzes the one or more electrical signals or the related data to categorize different components of the drilling noise as rock contact noise and mechanical noise. The at least one processing unit derives a data log, a plan, or a control signal based on the categorized drilling noise components.

B: A method that comprises drilling a borehole and recording a drilling noise. The method also comprises categorizing different components of the recorded drilling noise as rock contact noise and mechanical noise. The method also comprises deriving a data log, a plan, or a control signal based on the categorized drilling noise components.

Each of the embodiments, A and B, may have one or more of the following additional elements in any combination. Element 1: the at least one processing unit analyzes components categorized as rock contact noise to identify bit contact noise components and stabilizer contact noise components, and wherein the at least one processing unit derives the data log, the plan, or the control signal by estimating a polycrystalline diamond compact (PDC) drill bit condition from the bit contact noise components. Element 2: the at least one processing unit analyzes components categorized as rock contact noise to identify bit contact noise components and stabilizer contact noise components, and wherein the at least one processing unit derives the data log, the plan, or the control signal by estimating a roller cone drill bit condition from the bit contact noise components. Element 3: the at least one processing unit derives the data log, the plan, or the control signal by identifying natural fractures from components categorized as rock contact noise. Element 4: the at least one processing unit derives the data log, the plan, or the control signal by estimating a mud motor condition from components categorized as mechanical noise. Element 5: the at least one processing unit derives the data log, the plan, or the control signal by estimating a constant velocity assembly condition from components categorized as mechanical noise. Element 6: the at least one processing unit derives the data log, the plan, or the control signal by estimating a bearing assembly condition from components categorized as mechanical noise. Element 7: the at least one processing unit analyzes the one or more electrical signals or the related data to categorize different components of the drilling noise as fluid flow noise, wherein the at least one processing unit derives the data log, the plan, or the control signal by estimating a drill bit nozzle condition from components categorized as fluid flow noise. Element 8: the at least one drilling component comprises a wired mud motor and a drill bit, wherein the at least one acoustic transducer is positioned between the wired mud motor and the drill bit, and wherein the wired mud motor conveys the one or more electrical signals from the at least one acoustic transducer to the downhole interface residing on an opposite side of the wired mud motor. Element 9: the at least one acoustic transducer comprises a plurality of spaced acoustic transducers, wherein the at least one processing unit analyzes a comparison of electrical signals or related data from at least two of the plurality of spaced acoustic transducers to categorize different components of the drilling noise as rock contact noise and mechanical noise. Element 10: wherein the bottomhole assembly further comprises a steering component, and wherein the at least one processor directs the steering component to adjust steering based on a control signal derived using natural fracture trends identified from drilling noise components categorized as rock contact noise. Element 11: the electronics of the BHA are trained based on the categorized drilling noise components to convey only a sub-set of available drilling noise components to the at least one processing unit. Element 12: further comprising a monitor to display a data log or a plan derived based on the categorized drilling noise components.

Element 13: further comprising analyzing components categorized as rock contact noise to identify bit contact noise components and stabilizer contact noise components, and analyzing the bit contact noise components to estimate a drill bit condition. Element 14: further comprising analyzing components categorized as rock contact noise to identify natural fractures. Element 15: further comprising analyzing components categorized as mechanical noise to estimate at least one of a mud motor condition, a constant velocity assembly condition, and a bearing assembly condition. Element 16: further comprising categorizing different components of the recorded drilling noise as fluid flow noise and analyzing components categorized as fluid flow noise to estimate a drill bit nozzle condition. Element 17: wherein recording the drilling noise is performed using at least one acoustic transducer between a wired mud motor and a drill bit. Element 18: wherein recording the drilling noise is performed using a plurality of spaced acoustic transducers, and wherein said categorizing is based on a comparison of electrical signals or related data from at least two of the plurality of spaced acoustic transducers. Element 19: further comprising steering a drill string based on natural fracture trends identified from drilling noise components categorized as rock contact noise. Element 20: wherein deriving a plan comprising deriving a well completion plan that identifies fracture locations.

Numerous variations and modifications will become apparent to those skilled in the art once the above disclosure is fully appreciated. It is intended that the following claims be interpreted to embrace all such variations and modifications.

What is claimed is:
1. A system that comprises:
   at least one processing unit; and
   a bottomhole assembly (BHA) that includes or communicates with the at least one processing unit, the BHA comprising:

at least one drilling component; and
at least one acoustic transducer to convert drilling noise into one or more electrical signals;
wherein the at least one processing unit analyzes the one or more electrical signals or related data to categorize different components of the drilling noise as rock contact noise and mechanical noise,
wherein the at least one processing unit derives a data log, a plan, or a control signal based on the categorized drilling noise components to adjust drilling operations and adjust well completion plans.

2. The system of claim 1, wherein the at least one processing unit analyzes components categorized as rock contact noise to identify bit contact noise components and stabilizer contact noise components, and wherein the at least one processing unit derives the data log, the plan, or the control signal by estimating a polycrystalline diamond compact (PDC) drill bit condition from the bit contact noise components.

3. The system of claim 1, wherein the at least one processing unit analyzes components categorized as rock contact noise to identify bit contact noise components and stabilizer contact noise components, and wherein the at least one processing unit derives the data log, the plan, or the control signal by estimating a roller cone drill bit condition from the bit contact noise components.

4. The system of claim 1, wherein the at least one processing unit derives the data log, the plan, or the control signal by identifying natural fractures from components categorized as rock contact noise.

5. The system of claim 1, wherein the at least one processing unit derives the data log, the plan, or the control signal by estimating a mud motor condition from components categorized as mechanical noise.

6. The system of claim 1, wherein the at least one processing unit derives the data log, the plan, or the control signal by estimating a constant velocity assembly condition from components categorized as mechanical noise.

7. The system of claim 1, wherein the at least one processing unit derives the data log, the plan, or the control signal by estimating a bearing assembly condition from components categorized as mechanical noise.

8. The system of claim 1, wherein the at least one processing unit analyzes the one or more electrical signals or the related data to categorize different components of the drilling noise as fluid flow noise, wherein the at least one processing unit derives the data log, the plan, or the control signal by estimating a drill bit nozzle condition from components categorized as fluid flow noise.

9. The system of claim 1, wherein the at least one drilling component comprises a wired mud motor and a drill bit, wherein the at least one acoustic transducer is positioned between the wired mud motor and the drill bit, and wherein the wired mud motor conveys the one or more electrical signals from the at least one acoustic transducer to the downhole interface residing on an opposite side of the wired mud motor.

10. The system of claim 1, wherein the at least one acoustic transducer comprises a plurality of spaced acoustic transducers, wherein the at least one processing unit analyzes a comparison of electrical signals or related data from at least two of the plurality of spaced acoustic transducers to categorize different components of the drilling noise as rock contact noise and mechanical noise.

11. The system of claim 1, wherein the bottomhole assembly further comprises a steering component, and wherein the at least one processor directs the steering component to adjust steering based on a control signal derived using natural fracture trends identified from drilling noise components categorized as rock contact noise.

12. The system of claim 1, wherein electronics of the BHA are trained based on the categorized drilling noise components to convey only a sub-set of available drilling noise components to the at least one processing unit.

13. The system of claim 1, further comprising a monitor to display a data log or a plan derived based on the categorized drilling noise components.

14. A method that comprises:
drilling a borehole;
recording a drilling noise;
categorizing different components of the recorded drilling noise as rock contact noise and mechanical noise;
deriving a data log, a plan, or a control signal based on the categorized drilling noise components; and
adjusting drilling operations and well completion plans using the derived data log, plan, or control signal.

15. The method of claim 14, further comprising analyzing components categorized as rock contact noise to identify bit contact noise components and stabilizer contact noise components, and analyzing the bit contact noise components to estimate a drill bit condition.

16. The method of claim 14, further comprising analyzing components categorized as rock contact noise to identify natural fractures.

17. The method of claim 14, further comprising analyzing components categorized as mechanical noise to estimate at least one of a mud motor condition, a constant velocity assembly condition, and a bearing assembly condition.

18. The method of claim 14, further comprising categorizing different components of the recorded drilling noise as fluid flow noise and analyzing components categorized as fluid flow noise to estimate a drill bit nozzle condition.

19. The method of claim 14, wherein recording the drilling noise is performed using at least one acoustic transducer between a wired mud motor and a drill bit.

20. The method of claim 14, wherein recording the drilling noise is performed using a plurality of spaced acoustic transducers, and wherein said categorizing is based on a comparison of electrical signals or related data from at least two of the plurality of spaced acoustic transducers.

21. The method of claim 14, further comprising steering a drill string based on natural fracture trends identified from drilling noise components categorized as rock contact noise.

22. The method of claim 14, wherein the well completion plans identify plans identify fracture locations.

* * * * *

UNITED STATES PATENT AND TRADEMARK OFFICE
CERTIFICATE OF CORRECTION

PATENT NO. : 10,422,912 B2
APPLICATION NO. : 15/503309
DATED : September 24, 2019
INVENTOR(S) : Stephen Robert Holtz Page 1 of 1

It is certified that error appears in the above-identified patent and that said Letters Patent is hereby corrected as shown below:

In the Specification

In Column 8, Line 26, after --to obtain a-- delete "BRA" and insert --BHA--

In Column 8, Line 33, after --tify-- delete "BRA" and insert --BHA--

In the Claims

In Column 16, Line 57, Claim 22, delete "plans identify plans identity fracture locations." and insert --plans identity fracture locations.--

Signed and Sealed this
Twenty-fourth Day of December, 2019

Andrei Iancu
*Director of the United States Patent and Trademark Office*